(12) United States Patent
Trail et al.

(10) Patent No.: US 10,462,451 B1
(45) Date of Patent: Oct. 29, 2019

(54) ASYMMETRIC STRUCTURED LIGHT SOURCE

(71) Applicant: Facebook Technologies, LLC, Menlo Park, CA (US)

(72) Inventors: Nicholas Daniel Trail, Bothell, WA (US); Richard Andrew Newcombe, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/973,238

(22) Filed: May 7, 2018

Related U.S. Application Data

(60) Provisional application No. 62/505,217, filed on May 12, 2017.

(51) Int. Cl.
  *H04N 13/271* (2018.01)
  *G06T 7/521* (2017.01)
  *H04N 13/254* (2018.01)
  *G06T 19/00* (2011.01)

(52) U.S. Cl.
  CPC ......... *H04N 13/254* (2018.05); *H04N 13/271* (2018.05); *G06T 7/521* (2017.01); *G06T 19/006* (2013.01); *G06T 2207/10028* (2013.01)

(58) Field of Classification Search
  CPC .... H04N 13/271; H04N 5/2256; G01B 11/22; G03B 17/54
  See application file for complete search history.

(56) References Cited

U.S. PATENT DOCUMENTS

| 10,132,616 B2 * | 11/2018 | Wang | G01B 11/22 |
| 10,203,762 B2 * | 2/2019 | Bradski | G02B 27/225 |
| 10,210,664 B1 * | 2/2019 | Chaturvedi | G06T 19/006 |
| 2013/0194259 A1 * | 8/2013 | Bennett | G06T 19/006 345/420 |

* cited by examiner

*Primary Examiner* — Tsion B Owens
(74) *Attorney, Agent, or Firm* — Fenwick & West LLP (57) ABSTRACT

A depth camera assembly includes an illumination source assembly, a projection assembly, and an imaging device. The illumination source assembly emits light in accordance with emission instructions. The illumination source assembly includes a plurality of emitters on a single substrate. The projection assembly projects light from the illumination source assembly into a local area. The projection assembly includes an optical element that is positioned to receive light from a first emitter at a first angle and project the received light from the first emitter to a first depth zone in the local area, and to receive light from a second emitter at a second angle and project the received light from the second emitter to a second depth zone in the local area. The imaging device captures one or more images of the local area illuminated with the light from the illumination source assembly.

20 Claims, 4 Drawing Sheets

ASYMMETRIC STRUCTURED LIGHT SOURCE

CROSS REFERENCE TO RELATED APPLICATIONS

This application claims the benefit of U.S. Provisional Application No. 62/505,217, filed May 12, 2017, which is incorporated by reference in its entirety.

BACKGROUND

The present disclosure generally relates to virtual and/or augmented reality systems and more specifically relates to an asymmetric structured light source to control structured light emission from a depth camera assembly.

Virtual reality (VR) systems or augmented reality (AR) systems can leverage the capture of the environment surrounding a user in three dimensions (3D). However, traditional depth camera imaging architectures are comparably large in size, heavy, and consume significant amounts of power. Example depth camera imaging architectures for obtaining 3D information of a scene include e.g., stereo vision, time-of-flight (ToF) and structured light (SL). Different depth camera imaging architectures provide different strengths and weaknesses, so certain depth camera imaging architectures may provide better performance than others in different operating conditions. For instance, stereo vision architectures operate well with high ambient illumination, while ToF architectures having an active illumination source may be impaired by limitations in signal-to-noise ratio from ambient illumination. However, because of the relatively large size of conventional depth camera imaging architectures, many systems including a depth camera typically use a single type of depth camera imaging architecture, in a static configuration and/or pattern configured for a particular use case. As VR and AR (generally under mixed-reality, both on-body and off-body) systems are increasingly used to perform a broader range of functions in varied operating conditions and environments, selecting a depth camera imaging architecture to obtain various depth information of a local area surrounding the system and the user may use more capability and flexibility. However, the design of such VR and AR systems are still imposed with the same volume and weight limitations.

SUMMARY

Embodiments relate to a depth camera assembly that includes an illumination source assembly, a projection assembly, and an imaging device. The illumination source assembly emits light in accordance with emission instructions. The illumination source assembly includes a plurality of emitters on a single substrate. In some configurations, the plurality of emitters includes at least a first emitter and a second emitter. The projection assembly projects light from the illumination source assembly into a local area. The projection assembly includes an optical element that is positioned to receive light from the first emitter at a first angle and project the received light from the first emitter to a first depth zone in the local area, and to receive light from the second emitter and project the received light from the second emitter to a second depth zone in the local area. The imaging device captures one or more images of the local area illuminated with the light from the illumination source assembly.

Embodiments also relate to a head mounted-display (HMD) that includes an electronic display, and a depth camera assembly (DCA). The depth camera assembly includes an illumination source assembly, a projection assembly, an imaging device, and a controller. The illumination source assembly emits light in accordance with emission instructions. The illumination source assembly includes a plurality of emitters on a single substrate. In some configurations, the plurality of emitters includes at least a first emitter and a second emitter. The projection assembly projects light from the illumination source assembly into a local area. The projection assembly includes an optical element that is positioned to receive light from the first emitter at a first angle and project the received light from the first emitter to a first depth zone in the local area, and to receive light from the second emitter and project the received light from the second emitter to a second depth zone in the local area. The imaging device captures one or more images of the local area illuminated with the light from the illumination source assembly. The controller determines the emission instructions based in part on a digital model of the local area, and provides the emission instructions to the illumination source assembly.

In some embodiments, the controller determines a first depth information based in part on one or more images of the local area illuminated with the light from the first emitter, determines a second depth information based in part on one or more images of the local area illuminated with the light from the second emitter, and updates a digital model of the local area based in part on the first depth information and the second depth information.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A depth camera assembly (DCA) that captures data describing depth information in a local area surrounding the DCA. The DCA includes an imaging device, a controller, and a structured light source. The structured light source includes a plurality of emitters located on a single substrate and the substrate with said emitters is tilted relative to a projection assembly to control the emission of structured light from the DCA to introduce an asymmetry into the optical paths of light emitted from the emitters. The asymmetry allows for light emitted from emitters to be projected into a plurality of depth zones within the local area. For example, light from a first emitter may be projected as structured light into a near region (e.g., 0.3-1 m from the DCA) of the local area, whereas light from a second emitter may be projected as structured light into a far region (1-10 m) of the local area. The imaging device captures images of the local area illuminated with the light from one or more of the plurality of emitters. The images may be used by, e.g., a controller to determine one or more depth information for a local area via a variety of techniques including, e.g., stereo vision, photometric stereo, structured light (SL), time-of-flight (ToF), or some combination thereof.

A common substrate is used to hold the plurality of emitters as part of the structured light source and the common substrate is tilted relative to the projection assembly. Therefore, locations and/or orientations of each emitter may be determined based in part on extreme precision of a lithographic (e.g. semiconductor fabrication) process used to form the emitters on the single substrate.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
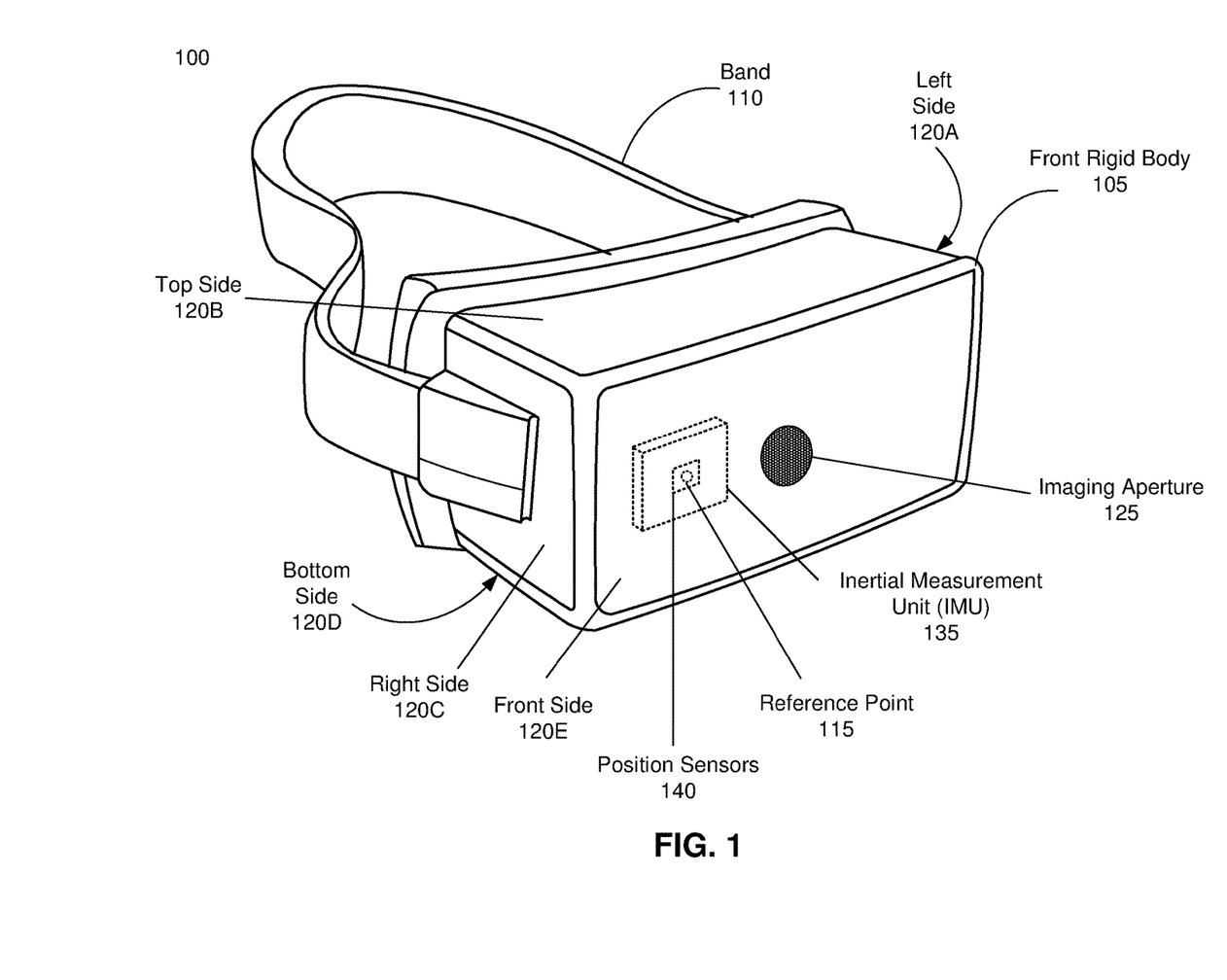
FIG. 1 is a diagram of a head-mounted display, in accordance with an embodiment.

FIG. 1 is a wire diagram of one embodiment of a HMD 100. The HMD 100 includes a front rigid body 105, a band 110, a reference point 115, a left side 120A, a top side 120B, a right side 120C, a bottom side 120D, and a front side 120E. The HMD 100 may be part of, e.g., a VR system, an AR system, a MR system, or some combination thereof. The HMD 100 may also work in a remote system such as a remote 'tower', a cellphone, or any other wearable, off-head, devices. In embodiments that describe AR system and/or a MR system, portions of the front side 120E of the HMD 100 are at least partially transparent in the visible band (~380 nm to 750 nm), and portions of the HMD 100 that are between the front side 120E of the HMD 100 and an eye of the user are at least partially transparent (e.g., a partially transparent electronic display).

The HMD 100 includes an imaging aperture 125. An imaging device captures light from a structured light source (not shown) and ambient light in a local area through the imaging aperture 125. The structured light source includes a plurality of emitters tilted relative to a projection assembly (not shown). Each emitter emits light having certain characteristics (e.g., wavelength, polarization, coherence, temporal behavior, etc.). The front rigid body 105 includes one or more electronic display elements of an electronic display (not shown), an IMU 135, one or more position sensors 140, and a reference point 115, as described in detail below in conjunction with FIG. 4.

Figure 2:
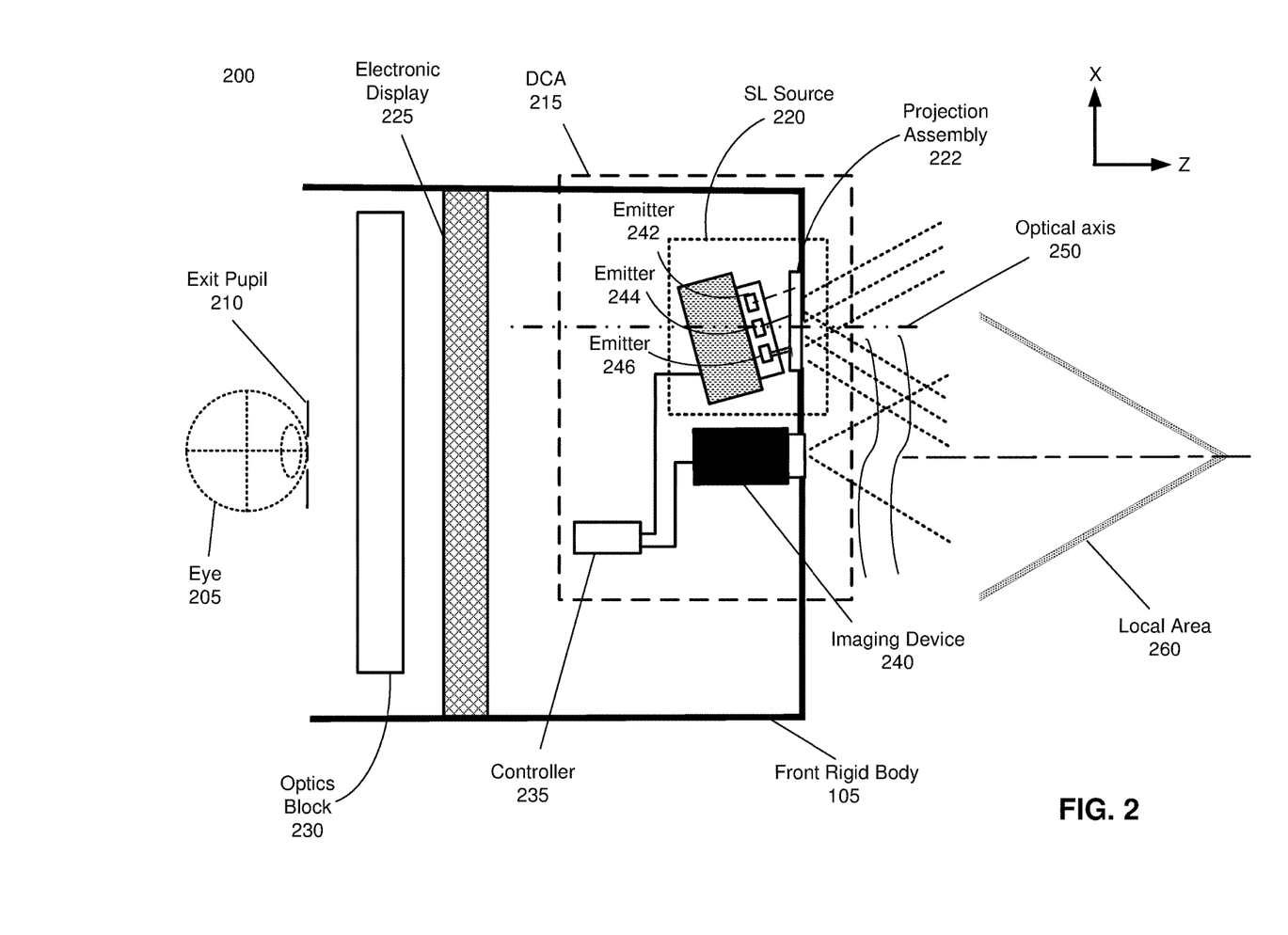
FIG. 2 is a cross section of a front rigid body of a head-mounted display, including a depth camera assembly in accordance with an embodiment.

FIG. 2 is a cross section 200 of the front rigid body 105 of the HMD 100, including a depth camera assembly (DCA) 215 in accordance with an embodiment. In some embodiments, the cross section 200 is part of some other HMD. The front rigid body 105 includes the DCA 215, an electronic display 225, and an optics block 230. Some embodiments of the HMD 100 have different components than those described here. Similarly, in some cases, functions can be distributed among the components in a different manner than is described here. The front rigid body 105 also includes an exit pupil 210 where an eye 205 of a user would be located. For purposes of illustration, FIG. 2 shows the cross section 200 of the front rigid body 105 in accordance with a single eye 205. Although FIG. 2 depicts a center cross-section of the eye 205 as being in the same plane as the DCA 215, the center cross-section of the eye 205 and the DCA 215 do not have to be in the same plane. Additionally, another electronic display 225 and optics block 230, separate from those shown in FIG. 2, may be included in the front rigid body 105 to present content, such as an augmented representation of a local area 260 or virtual content, to another eye of the user.

The depth camera assembly (DCA) 215 includes a structured light source 220, a projection assembly 222, an imaging device 240, and a controller 235. The structured light source 220 illuminates the local area 260 with light. The local area 260 is an area surrounding the HMD 100 and includes objects in a field of view of the imaging device 240. The structured light source 220 includes a plurality of emitters on a single substrate that emit light onto the local area 260. In one embodiment, the structured light source 220 includes an emitter 242, an emitter 244, and an emitter 246. Note three emitters is merely illustrative, and fewer or more emitters may be included in the structured light source 220. A typical emitter could be a laser diode made by a semiconductor fabrication process. A plurality of laser diodes could be made on a single substrate, as diced from a parent wafer together, and maintained in as-fabricated orientation (common structure carrier, inheriting semiconductor/lithographic precision) in the structured light source 220. Additionally, in some embodiments, the structured light source 220 may include multiple substrates each including one or more emitters. And in some instances, an orientation of one or both of the substrates relative to an optical axis 250 of the structured light source 220 may be dynamically adjusted (e.g., via a mechanical drive, optical prism with variable angles or index, etc.) in accordance with instructions from the controller 235.

In one embodiment, spacing between laser diodes may be 50 to 250 microns. In other embodiments, the spacing between laser diodes ranges from 0.2 mm to 1.5 mm. Neighboring emitters in the structured light source 220 may be spaced equally or in some embodiments, unequally. For example, in one embodiment, the distance between emitter 242 and emitter 244 is the same as the distance between emitter 244 and emitter 246. However, in another embodiment, the distance between emitter 242 and emitter 244 is a different distance than the distance between emitter 244 and emitter 246, for example 0.2 versus 1.0 mm respectively. Since a plurality of emitters may be on the same substrate, shifts in location of the structured light source 220 due to events such as temperature changes, environment shocks, or environmental impacts may similarly affect the plurality of emitters. The shifts can be correlated based upon the differences in the retrieved images of patterns from each emitter in the structured light source 220, and the depth retrieval accuracy can be improved by knowledge of the change in location of the structured light source 220. In addition, because each emitter is geometrically separated by micrometers to millimeters and has few or no interfaces in the structural support, it may be resilient to any gradients in the system, which can otherwise affect performance in a non-linear and hard to predict manner.

Each of the emitters 242, 244, and 246 is held by a single, monolithic substrate in a tilted manner relative to an optical axis 250 of the structured light source 220. The tilt introduces an asymmetry into optical paths of light emitted from the emitters 242, 244, and 246 toward the projection assembly 222. As discussed below, the asymmetry allows for light emitted from emitters to be projected into a plurality of depth zones within the local area 260. Each of the emitter 242 and the emitter 244 is located relative to the optical axis 250 of the structured light source 220 by a threshold value. This sets the output angle for each emitter which may be utilized 'off-axis' relative to the projection assembly 222. In addition, the tilt of the carrier (which can be measured in angular coordinates relative to the nominal focus plane, or in linear dimensions, such as offset or run-out) is controlled to set the focus positions of the emitters relative to the projector optical system. For instance, it may be that emitter 246 is nominally set to achieve focus at 3 meters in the scene, and through the tilt of the carrier (which is some small angle nominally that puts the rest of the emitters at a longer back-focal length position relative to the optical system) emitter 244 is then focused closer, for example near 1 meter, while emitter 246 is focused even closer, for example at 0.4 meters. In some embodiments, the emitter 242 includes a pair of a first emitter element and a second emitter element (not shown). Each of the first emitter element and the second emitter element has a threshold value of spacing between the origination points corresponding to each of the emitter elements. In one example, the threshold value of spacing is in the range of 10 microns to 3,000 microns. An origination point is a location on the emitter 242 through which light emitting out of the emitter 242 originates.

Each emitter 242, 244, 246, emits light having certain characteristics. A characteristic is a feature that describes light emitted from an emitter. A characteristic may be e.g., polarization, range of wavelengths, amplitude, temporal modulation, some other feature that describes emitted light, or some combination thereof. In some embodiments, all of the plurality of emitters has the same characteristics. In other embodiments, one or more of the characteristics may be different in each emitter from other emitters in the structured light source 220. A range of wavelengths is generally some portion of a band of light. Example bands of light emitted by the structured light source 220 include: a visible band (~380 nm to 750 nm), an infrared (IR) band (~750 nm to 1900 nm), an ultraviolet band (100 nm to 380 nm), another portion of the electromagnetic spectrum, or some combination thereof. For example, in some embodiments, the emitter 242, the emitter 244, and the emitter 246 all emit the same range of wavelengths (e.g., near 950 nm). In alternate embodiments, the emitter 242 emits in the visible band, the emitter 244 emits in a sub-region of the IR band (for example 850 nanometers), and the emitter 246 emits in another portion of the IR band (for example 940 nanometers). Similarly other characteristics may vary or be the same between emitters in the structured light source 220. For example, emitter 242 and emitter 244 could emit circularly polarized light in a first portion of the IR band, and emitter 246 could emit linearly (vertically) polarized light at a second portion of the IR band.

The projection assembly 222 transforms light from the emitters into a structured light pattern. The projection assembly 222 includes one or more optical elements (not shown) common to the plurality of emitters. The optical elements may be, e.g., a single or multiple diffractive optical elements (DOE), a refractive or reflective collimation lens, a mask that when illuminated creates a SL pattern, etc. A DOE may be e.g., a Fresnel lens, a diffraction grating, a holographic grating, some other DOE, or some combination thereof. For example, in one embodiment, the one or more optical elements includes a common collimator lens and a DOE, where at least two of the emitter 242, the emitter 244, and the emitter 246 that are oriented to emit light through the DOE to create structured light. In some configurations, at least two of the emitter 242, the emitter 244, and the emitter 246 are oriented in a tilted manner to emit light through the DOE to create structured light. The structured light produced is a specified pattern, such as a symmetric or quasi-random dot pattern, grid, or horizontal bars based on the orientation of the emitters in a tilted manner relative to the one or more optical elements.

The projection assembly 222 then projects the structured light into one or more depth zones of the local area. The projection assembly 222 also includes one or more lenses, one or more mirrors, and adjustable optical element (e.g., a scanning mirror, an adjustable lens, etc.), or some combination thereof. An adjustable optical element is one or more optical elements (e.g., lens, mirror, etc.) that are able to adjust an optical path of the structured light pattern to different locations within the local area 260. For example, a scanning mirror may be used to extend the range of depth zones corresponding to the light from an emitter that may be used to illuminate with a structured light.

The imaging device 240 captures images of the local area 260. The imaging device 240 may include one or more detectors and one or more optical elements (e.g., one or more lenses, a diffractive element, a wavelength filter, a polarizer, an aperture, or some combination thereof). The imaging device 240 may capture and record particular bands of light or specific polarizations of light. For example, the imaging device 240 may capture images including light in the visible band and in the infrared band. The imaging device 240 may capture images including light of specific polarizations (e.g. circularly, linearly polarized light). In some embodiments, the imaging device 240 may include a lens array that presents multiple images of the local area across different regions of a detector of the imaging device 240.

The controller 235 is configured to divide the local area 260 into one or more depth zones. The controller 235 associates each depth zone with one or more emitters. In some embodiments, one or more of the depth zones overlap. Additionally, in some embodiments, the size (e.g., for a given depth zone—boundary farthest from the DCA 215 minus the boundary nearest the DCA 215.) and the location (e.g., distance from DCA 215) of a depth zone may be varied by the controller 235. In some embodiments, the tilts of one or more of the emitters in the structured light source 220 is fixed—and hence emit light at a fixed angle toward the projection assembly 222. In alternate embodiments, relative angles between one or more of the emitters and the optical axis 250 of the projection assembly 222 may be adjusted via the controller 235. Likewise, in some embodiments, the controller 235 may instruct the projection assembly 222 to dynamically adjust placement of a structured light pattern in the local area 260.

The controller 235 is configured to determine emission instructions based in part on a digital model of the local area 260. The controller 235 provides the emission instructions to the structured light source 220 and determines first depth information based on images of the local area 260 illuminated with the light from the emitter 242. Similarly, the controller 235 determines second depth information based on images of the local area 260 illuminated with the light from the emitter 244. The controller 235 updates the digital model of the local area 260 based on the first depth information and the second depth information.

In some embodiments, the controller 235 is configured to determine depth information for objects in the local area 260 using one or more images. The controller 235 controls how light is emitted from the structured light source 220 and how the imaging device 240 captures light. For example, the controller 235 instructs one or more emitters in the structured light source 220 to emit light. In this manner, the controller 235 controls properties such as timing, intensity, wavelength range, polarization, field of view limits, and density (in the case of SL) of the structured light source 220. The controller 235 can also control the timing of when data is collected from the imaging device 240. Thus, the controller 235 can coordinate the capturing of data by the imaging device 240 with light emission by the structured light source 220. In alternate embodiments, some other device (e.g., console 410) determines depth information for the local area 260.

In some embodiments, the controller 235 is configured to determine depth information based in part on the technique employed for capturing depth information. For example, the depth information could be determined by using one or a combination of the following techniques: stereo vision, photometric stereo, SL such as triangulation, and ToF, including pulse and phase retrieval.

The controller 235 may also cause the DCA 215 to capture depth information using a (active or assisted) stereo vision technique. In one embodiment, the controller 235 controls two or more detectors from the imaging device 240 to capture light reflected off of the local area 260. The detectors of imaging device 240 are located a fixed distance apart from each other and can be used to extract depth information. Each detector collects light that is reflected from the local area 260 (e.g., one or more objects in the local area 260). In an alternative embodiment, the controller 235 coordinates the emitting of light from the structured light source 220 with the collection of light from two or more detectors located inside the imaging device 240. The data collected by the controller 235, which contains data from different vantage points, can be compared to determine depth information.

The controller 235 may also cause the DCA 215 to capture depth information using a photometric stereo technique. The controller 235 coordinates the emitting of light from two or more emitters of the plurality of emitters with the collection of light from the imaging device 240. The data collected by the controller 235, which includes data with different lighting conditions, can be used to determine depth of objects in the local area 260.

The controller 235 may also cause the DCA 215 to capture depth information using a SL technique. In one embodiment, the controller 235 controls a structured light source 220 to emit SL with a specific pattern onto the local area 260. The controller 235 can turn on one or more emitters of the structured light source 220 to increase the density, field of view, or baseline of the specific pattern. For example, the controller 235 may activate more emitters if the local area 260 includes an object with fine detail. The controller 235 coordinates the emitting of the SL from the structured light source 220 with the collection of light by the imaging device 240. The data collected by the controller 235, which includes SL information, can be used to determine depth of objects in the local area 260. The controller 235 can also activate each emitter at different times and use the imaging device 240 to capture multiple images for the multiple emitters, improving the accuracy of depth determination.

The controller 235 may also cause the DCA 215 to capture depth information using a ToF technique. In one embodiment, the controller 235 controls the time when one or more emitters are activated in the structured light source 220, and effectively measures the accumulated phase offset (comparable to time difference) it takes for the emitted light to be reflected from the local area 260 and detected by the imaging device 240. The data collected by the controller 235, which includes ToF information, can be used to determine depth of objects in the local area 260.

Figure 3:
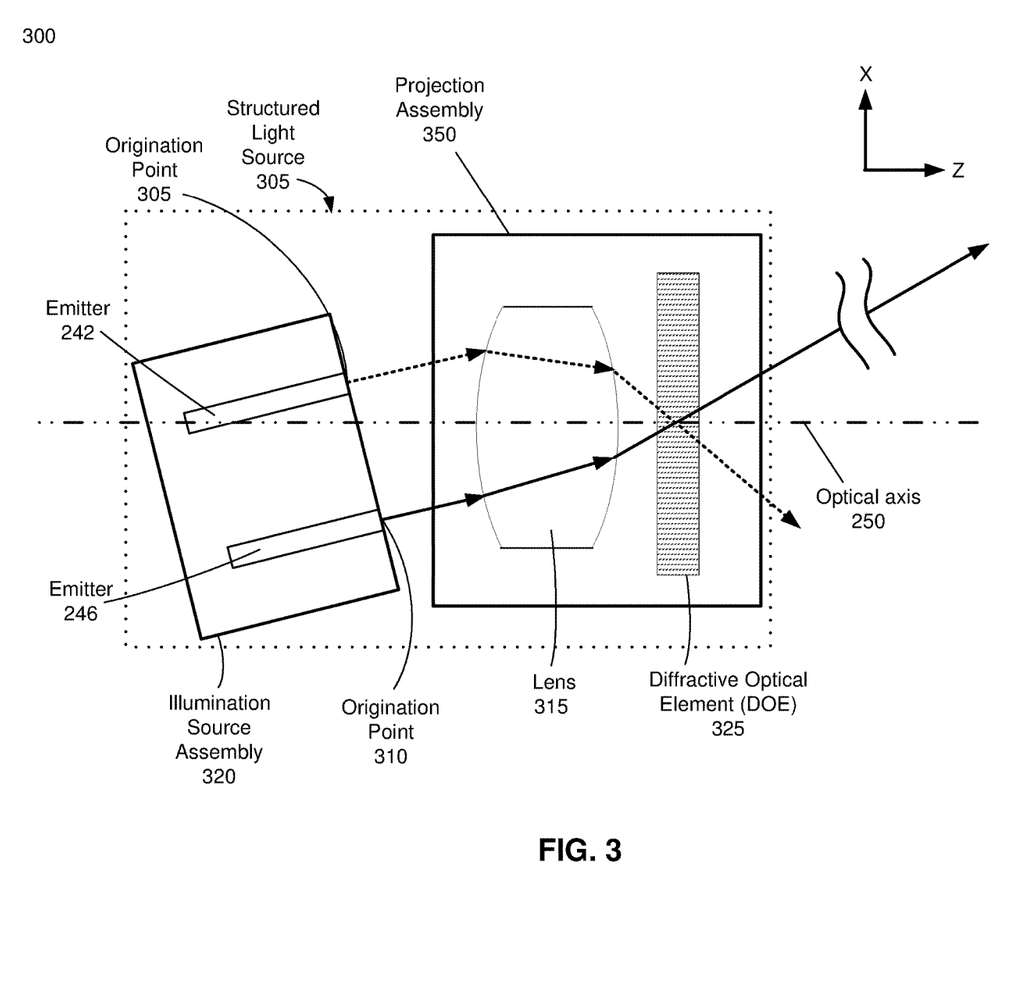
FIG. 3 is a cross section of a structured light (SL) source in accordance with an embodiment.

FIG. 3 is a cross section 300 of a structured light source 300, in accordance with an embodiment. The structured light source 305 is an embodiment of the structure light source 220. The structured light source 305 includes an illumination source assembly 320 and a projection assembly 350. The illumination source assembly 320 is a unit that emits light from one or more locations to the projection assembly 350. In some embodiments, the illumination source assembly 320 includes the emitter 242 and the emitter 246 oriented in a tilted manner relative to the optical axis 250, as described above in conjunction with FIG. 2. The emitter 242 and the emitter 246 emit light exiting the corresponding laser cavity at the origination point 305, and the origination point 310, respectively. In some embodiments, the origination point 305 and the origination point 310 are spaced relative to each other in a range of 50 microns to 500 microns.

The projection assembly 350 includes one or more optical elements that receive the light emitted by the plurality of emitters of the illumination source assembly 320 oriented in a tilted manner relative to the optical axis 250. The optical elements may be, e.g., a diffractive optical element (DOE), a collimation lens, a mask that when illuminated creates a SL pattern, etc. A DOE may be e.g., a Fresnel lens, a diffraction grating, some other DOE, or some combination thereof. In the example of FIG. 3, the projection assembly 350 includes a lens 315 and a DOE 325. The lens 315 is a conditioning lens that conditions (e.g. collimates or sets the conjugate focus plane as based upon tilt and relative focus across the illumination source assembly 320) the light emitted by the illumination source assembly 320 oriented in a tilted manner relative to the optical axis 250. The DOE 325 is an optical element that creates the SL pattern (e.g. horizontal bar pattern, pseudo-random dot pattern, etc.) based on the light directed from the lens 315.

In alternate embodiments, the projection assembly 350 includes a plurality of lenses 315 and the DOE 325. For example, the emitter 242 oriented in a tilted manner relative to the optical axis 250 emits light through a first lens and a first DOE to produce a first pattern (e.g., grid, parallel bars, etc.), and the emitter 244 oriented in a tilted manner relative to the optical axis 250 emits light through a second lens and a second DOE to produce a second pattern. The second pattern may be the same or different from the first pattern. The plurality of lenses 315 includes a second lens different from the first lens. In alternate embodiments, the second lens is identical to the first lens.

In the embodiment of FIG. 3, the illumination source assembly 320 shows the orientation of the emitter 242 and the emitter 246 in a tilted manner with respect to the optical axis 250. In one example, each of the emitter 242 and the emitter 246 may each include two or more laser diodes. Each of the laser diodes is offset from the optical axis 250 by a nominal value which can be equal or asymmetric based upon desired field-of-view for each emitter and/or relative angle differences. The nominal value is measured from the optical axis 250 in the radial direction (perpendicular to the optical axis 250), and would be controlled to some tolerance allocation. For example, the nominal value can be 250 microns+/−50 microns. In some embodiments, the nominal value can be equal for the emitters 242 and 246. In alternate embodiments, as shown in FIG. 3, the nominal value can have a different magnitude for different emitters (e.g. 200 microns for the emitter 242, and 300 microns for the emitter 246). In addition, the spacing between the origination point 305 and the origination point 310 of each pair of laser diodes would be set by another value, in the plane of the emission points (e.g. 200 microns+/−2 microns). The spacing can be set equal or different when more emitters are included. As a result of the orientation in the tilted manner with respect to the optical axis of the projection assembly 350, one pair of laser diodes can be tilted with respect to the optical axis 250 to create a first structured light pattern at a near distance (e.g. 50 cm) and another pair of laser diodes can be tilted with respect to the optical axis 250 to create a second structured light pattern at a farther distance (e.g. 300 cm).

In an alternate embodiment, the projection assembly 350 can be dynamically tilted relative to the optical axis 250. For example, at least one of the lens 315 and the DOE 325 can be dynamically tilted with a shift in the magnitude of approximately 0.5 to 5.0 degrees to create a set of structured light patterns outputted to two or more depth zones in a local area. The dynamic tilt can also be created with piezo-actuators moving either element, and/or by inserting a liquid-crystal layer, or other fluid cell to create a variable prism power in the optical path.

Additionally, in some embodiments, one or more optical elements (e.g., collimation lens and/or diffractive optical element) may be shared between one or more emitters. If a lens moves, it causes a linear effect on all of the emitters that share the optical element, which may be corrected more easily than individually aligning an emitter to a corresponding optical element. In some embodiments, each emitter is comparable in overall power and goes through a common optical path to increase the resiliency of the system calibration to potential uncalibrated shifts after production. In some embodiments, multiple emitters are collimated and sent through a diffractive optical element (e.g., for structured light applications) resulting in a known and stable offset for the pattern origin, which can improve depth information retrieval as described below.

System Overview

Figure 4:
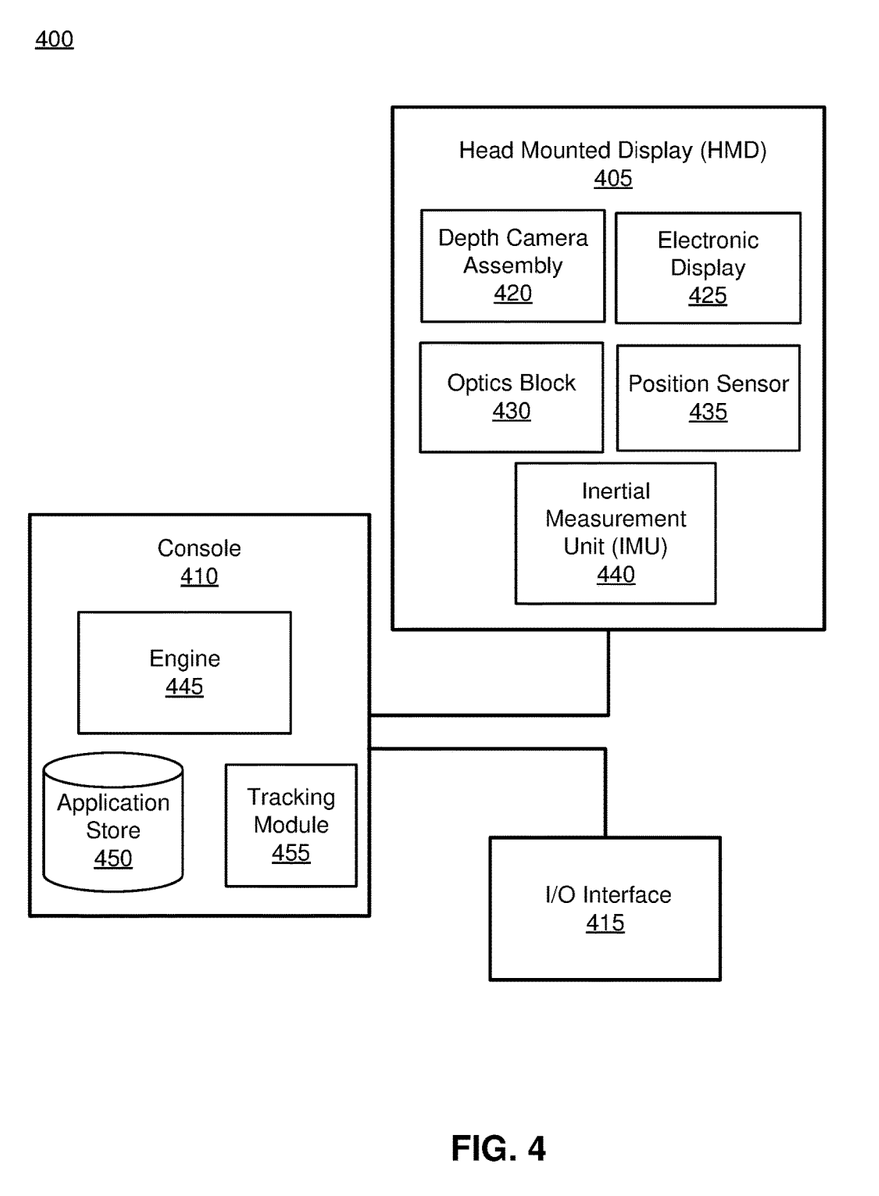
FIG. 4 is a block diagram of one embodiment of a HMD system in which a console operates, in accordance with an embodiment.

FIG. 4 is a block diagram of one embodiment of a HMD system 400 in which a console 410 operates, in accordance with an embodiment. The HMD 400 may also work in a remote system such as a remote 'tower', a cellphone, or any other wearable, off-head, devices. The HMD 405 may operate in a VR system environment, an AR system environment, a MR system environment, or some combination thereof. The HMD system 400 shown by FIG. 4 comprises a HMD 405 and an input/output (I/O) interface 415 that is coupled to the console 410. While FIG. 4 shows an example HMD system 400 including one HMD 405 and an I/O interface 415, in other embodiments, any number of these components may be included in the HMD system 400. For example, there may be multiple HMDs 405 each having an associated I/O interface 415, with each HMD 405 and I/O interface 415 communicating with the console 410. In alternative configurations, different and/or additional components may be included in the HMD system 400. Additionally, functionality described in conjunction with one or more of the components shown in FIG. 4 may be distributed among the components in a different manner than described in conjunction with FIG. 4 in some embodiments. For example, some or all of the functionality of the console 410 is provided by the HMD 405.

The HMD 405 is a head-mounted display that presents content to a user comprising virtual and/or augmented views of a physical, real-world environment with computer-generated elements (e.g., two dimensional (2D) or three dimensional (3D) images, 2D or 3D video, sound, etc.). In some embodiments, the presented content includes audio that is presented via an external device (e.g., speakers and/or headphones) that receives audio information from the HMD 405, the console 410, or both, and presents audio data based on the audio information. The HMD 405 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

The HMD 405 includes a depth camera assembly (DCA) 420, an electronic display 425, an optics block 430, one or more position sensors 435, and an inertial measurement Unit (IMU) 440. Some embodiments of the HMD 405 have different components than those described in conjunction with FIG. 4. Additionally, the functionality provided by various components described in conjunction with FIG. 4 may be differently distributed among the components of the HMD 405 in other embodiments.

The DCA 420 captures data describing depth information of an area surrounding the HMD 405. The data describing depth information may be associated with one or a combination of the following techniques used to determine depth information: stereo vision, photometric stereo, SL, and ToF. The DCA 420 can compute the depth information using the data, or the DCA 420 can send this information to another device such as the VR console 410 that can determine the depth information using data from the DCA 420.

The DCA 420 includes a structured light source, an imaging device, and a controller. The structured light source of the DCA 720 is configured to illuminate a local area with one or more structured light patterns in accordance with emission instructions from the controller. The structured light source includes an illumination source assembly and a projection assembly. The illumination source assembly includes a plurality of emitters on a single substrate oriented relative to the nominal focus plane along the optical axis of the projection assembly in order to introduce an asymmetry into the optical paths of light emitted from the emitters. In some configurations, the plurality of emitters are oriented in a tilted manner relative to the optical axis of the projection assembly. The asymmetry allows for light emitted from emitters to be projected into a plurality of depth zones within the local area. For example, light from a first emitter may be projected as structured light into a first depth zone (e.g., 0.3-1 m from the DCA) of the local area, whereas light from a second emitter may be projected as structured light into a second depth zone (1-10 m) of the local area, and so on.

The projection assembly is configured to shape a profile of the one or more structured light patterns in order to allow the one or more structured light patterns to illuminate a desired portion of the local area and project the one or more structured light patterns into the local area. The imaging device captures ambient light and light from one or more emitters of the plurality of emitters that is reflected from objects in the area. The controller coordinates how the illumination source emits light and how the imaging device captures light. In some embodiments, the controller may also determine depth information associated with the local area using the captured images.

A common substrate is used to hold the plurality of emitters as part of the structured light source, allowing for precise determinations of each emitter location. Each emitter location is known and offset from neighboring emitters by a distance on the magnitude of tens to thousands of micrometers (in X-axis, Y-axis, and/or Z-axis). Each emitter at a different origination point behind a common or discrete optical system produces known offsets in, e.g., produced SL patterns. The pattern offsets may be useful in depth information determination, such as improving resolution, accuracy, and precision limits. Additionally, by alternating or using multiple emitters through time, relative pattern shifts between emitters may improve determination, resolution, precision, and resiliency of depth information. Additionally, one or more of the plurality of emitters may be configured to act as a "spare" emitter that may be activated in the event of failure of one or more other emitters in the structured light source.

The electronic display 425 displays 2D or 3D images to the user in accordance with data received from the console 410. In various embodiments, the electronic display 425 comprises a single electronic display or multiple electronic displays (e.g., a display for each eye of a user). Examples of the electronic display 425 include: a liquid crystal display (LCD), an organic light emitting diode (OLED) display, an active-matrix organic light-emitting diode display (AMOLED), some other display, or some combination thereof.

The optics block 430 magnifies image light received from the electronic display 425, corrects optical errors associated with the image light, and presents the corrected image light to a user of the HMD 405. In various embodiments, the optics block 430 includes one or more optical elements. Example optical elements included in the optics block 430 include: an aperture, a Fresnel lens, a convex lens, a concave lens, a filter, a reflecting surface, or any other suitable optical element that affects image light. Moreover, the optics block 430 may include combinations of different optical elements. In some embodiments, one or more of the optical elements in the optics block 430 may have one or more coatings, such as partially reflective or anti-reflective coatings.

Magnification and focusing of the image light by the optics block 430 allows the electronic display 425 to be physically smaller, weigh less and consume less power than larger displays. Additionally, magnification may increase the field of view of the content presented by the electronic display 425. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 430 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 425 for display is pre-distorted, and the optics block 430 corrects the distortion when it receives image light from the electronic display 425 generated based on the content.

The IMU 440 is an electronic device that generates data indicating a position of the HMD 405 based on measurement signals received from one or more of the position sensors 435 and from depth information received from the DCA 420. A position sensor 435 generates one or more measurement signals in response to motion of the HMD 405. Examples of position sensors 435 include: one or more accelerometers, one or more gyroscopes, one or more magnetometers, another suitable type of sensor that detects motion, a type of sensor used for error correction of the IMU 440, or some combination thereof. The position sensors 435 may be located external to the IMU 440, internal to the IMU 440, or some combination thereof.

Based on the one or more measurement signals from one or more position sensors 435, the IMU 440 generates data indicating an estimated current position of the HMD 405 relative to an initial position of the HMD 405. For example, the position sensors 435 include multiple accelerometers to measure translational motion (forward/back, up/down, left/right) and multiple gyroscopes to measure rotational motion (e.g., pitch, yaw, roll). In some embodiments, the IMU 440 rapidly samples the measurement signals and calculates the estimated current position of the HMD 405 from the sampled data. For example, the IMU 440 integrates the measurement signals received from the accelerometers over time to estimate a velocity vector and integrates the velocity vector over time to determine an estimated current position of a reference point on the HMD 405. Alternatively, the IMU 440 provides the sampled measurement signals to the console 410, which interprets the data to reduce error. The reference point is a point that may be used to describe the position of the HMD 405. The reference point may generally be defined as a point in space or a position related to the HMD's 405 orientation and position.

The IMU 440 receives one or more parameters from the console 410. As further discussed below, the one or more parameters are used to maintain tracking of the HMD 405. Based on a received parameter, the IMU 440 may adjust one or more IMU parameters (e.g., sample rate). In some embodiments, certain parameters cause the IMU 440 to update an initial position of the reference point so it corresponds to a next position of the reference point. Updating the initial position of the reference point as the next calibrated position of the reference point helps reduce accumulated error associated with the current position estimated the IMU 440. The accumulated error, also referred to as drift error, causes the estimated position of the reference point to "drift" away from the actual position of the reference point over time. In some embodiments of the HMD 405, the IMU 440 may be a dedicated hardware component. In other embodiments, the IMU 440 may be a software component implemented in one or more processors.

The I/O interface 415 is a device that allows a user to send action requests and receive responses from the console 410. An action request is a request to perform a particular action. For example, an action request may be an instruction to start or end capture of image or video data or an instruction to perform a particular action within an application. The I/O interface 415 may include one or more input devices. Example input devices include: a keyboard, a mouse, a game controller, or any other suitable device for receiving action requests and communicating the action requests to the console 410. An action request received by the I/O interface 415 is communicated to the console 410, which performs an action corresponding to the action request. In some embodiments, the I/O interface 415 includes an IMU 440, as further described above, that captures calibration data indicating an estimated position of the I/O interface 415 relative to an initial position of the I/O interface 415. In some embodiments, the I/O interface 415 may provide haptic feedback to the user in accordance with instructions received from the console 410. For example, haptic feedback is provided when an action request is received, or the console 410 communicates instructions to the I/O interface 415 causing the I/O interface 415 to generate haptic feedback when the console 410 performs an action.

The console 410 provides content to the HMD 100 for processing in accordance with information received from one or more of: the DCA 420, the HMD 405, and the I/O interface 415. In the example shown in FIG. 4, the console 410 includes an application store 450, a tracking module 455 and an engine 445. Some embodiments of the console 410 have different modules or components than those described in conjunction with FIG. 4. Similarly, the functions further described below may be distributed among components of the console 410 in a different manner than described in conjunction with FIG. 4.

The application store 450 stores one or more applications for execution by the console 410. An application is a group of instructions, that when executed by a processor, generates content for presentation to the user. Content generated by an application may be in response to inputs received from the user via movement of the HMD 405 or the I/O interface 415. Examples of applications include: gaming applications, conferencing applications, video playback applications, or other suitable applications.

The tracking module 455 calibrates the system 400 using one or more calibration parameters and may adjust one or more calibration parameters to reduce error in determination of the position of the HMD 405 or of the I/O interface 415. For example, the tracking module 455 communicates a calibration parameter to the DCA 420 to adjust the focus of the DCA 420 to more accurately determine positions of SL elements captured by the DCA 420. Calibration performed by the tracking module 455 also accounts for information received from the IMU 440 in the HMD 405 and/or an IMU 440 included in the I/O interface 415. Additionally, if tracking of the HMD 405 is lost (e.g., the DCA 420 loses line of sight of at least a threshold number of SL elements), the tracking module 455 may re-calibrate some or all of the system 400.

The tracking module 455 tracks movements of the HMD 405 or of the I/O interface 415 using information from the DCA 420, the one or more position sensors 435, the IMU 440 or some combination thereof. For example, the tracking module 455 determines a position of a reference point of the HMD 405 in a mapping of a local area based on information from the HMD 405. The tracking module 455 may also determine positions of the reference point of the HMD 405 or a reference point of the I/O interface 415 using data indicating a position of the HMD 405 from the IMU 440 or using data indicating a position of the I/O interface 415 from an IMU 440 included in the I/O interface 415, respectively. Additionally, in some embodiments, the tracking module 455 may use portions of data indicating a position or the HMD 405 from the IMU 440 as well as representations of the local area from the DCA 420 to predict a future location of the HMD 405. The tracking module 455 provides the estimated or predicted future position of the HMD 405 or the I/O interface 415 to the engine 445.

The engine 445 generates a 3D mapping of the area surrounding the HMD 405 (i.e., the "local area") based on information received from the HMD 405. In some embodiments, the engine 445 determines depth information for the 3D mapping of the local area based on information received from the DCA 420 that is relevant for techniques used in computing depth. The engine 445 may calculate depth information using one or more techniques in computing depth (e.g., stereo vision, photometric stereo, SL, ToF, or some combination thereof). In various embodiments, the engine 445 uses the depth information to, e.g., update a model of the local area, and generate content based in part on the updated model.

The engine 445 also executes applications within the system 400 and receives position information, acceleration information, velocity information, predicted future positions, or some combination thereof, of the HMD 405 from the tracking module 455. Based on the received information, the engine 445 determines content to provide to the HMD 405 for presentation to the user. For example, if the received information indicates that the user has looked to the left, the engine 445 generates content for the HMD 405 that mirrors the user's movement in a virtual environment or in an environment augmenting the local area with additional content. Additionally, the engine 445 performs an action within an application executing on the console 410 in response to an action request received from the I/O interface 415 and provides feedback to the user that the action was performed. The provided feedback may be visual or audible feedback via the HMD 405 or haptic feedback via the I/O interface 415.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
   an illumination source assembly configured to emit light in accordance with emission instructions, the illumination source assembly comprising a plurality of emitters on a single substrate, the plurality of emitters comprising at least a first emitter and a second emitter;
   a projection assembly configured to project light from the illumination source assembly into a local area, the projection assembly comprising an optical element that is positioned to receive light from the first emitter at a first angle and project the received light from the first emitter to a first depth zone in the local area, and to receive light from the second emitter and project the received light from the second emitter to a second depth zone in the local area; and
   an imaging device configured to capture one or more images of the local area illuminated with the light from the illumination source assembly.

2. The DCA of claim 1, wherein the optical element is configured to generate structured light using light received from the first emitter and the second emitter, the structured light being determined by an orientation of the plurality of emitters relative to the optical element.

3. The DCA of claim 1, wherein the first emitter is separated from the second emitter by a one or more values of spacing in the range of 10 to 3,000 microns.

4. The DCA of claim 1, wherein the first emitter emits light in a first band, and the second emitter emits light in a second band different from the first band.

5. The DCA of claim 1, wherein the illumination source assembly comprises one or more emitters on a first substrate, and one or more emitters on a second substrate.

6. The DCA of claim 1, wherein each of the first emitter and the second emitter are a laser diode.

7. The DCA of claim 1, wherein:
   the first emitter comprises a first set of laser diodes tilted with respect to an optical axis of the illumination source assembly,
   the second emitter comprises a second set of laser diodes tilted with respect to the optical axis of the illumination source assembly, and
   wherein the first set of laser diodes is configured to emit a first light, and the second set of laser diodes is configured to emit a second light, and the projection assembly is configured to project the first light to a first distance and to project the second light to a second distance that is greater than the first distance.

8. The DCA of claim 1, further comprising a controller configured to:
   determine a first depth information based in part on one or more images of the local area illuminated with the light from the first emitter;
   determine a second depth information based in part on one or more images of the local area illuminated with the light from the second emitter; and
   update a model of the local area based in part on the first depth information and the second depth information.

9. The DCA of claim 8, wherein the controller is configured to determine emission instructions based in part on the model of the local area, and provide the emission instructions to the illumination source assembly.

10. The DCA of claim 9, wherein the projection assembly is dynamically tilted relative to an optical axis of the illumination source assembly in accordance with the emission instructions.

11. A head-mounted display (HMD) comprising:
   an electronic display configured to emit image light; and
   a depth camera assembly (DCA) comprising:
     an illumination source assembly configured to emit light in accordance with emission instructions, the illumination source assembly comprising a plurality of emitters on a single substrate, the plurality of emitters comprising at least a first emitter and a second emitter;
     a projection assembly configured to project light from the illumination source assembly into a local area, the projection assembly comprising an optical element that is positioned to receive light from the first emitter at a first angle and project the received light from the first emitter to a first depth zone in the local area, and to receive light from the second emitter and project the received light from the second emitter to a second depth zone in the local area;
     an imaging device configured to capture one or more images of the local area illuminated with the light from the illumination source assembly; and
     a controller configured to determine the emission instructions based in part on a model of the local area, and provide the emission instructions to the illumination source assembly.

12. The HMD of claim 11, wherein the optical element is configured to generate structured light using light received from the first emitter and the second emitter, the structured light being determined by an orientation of the plurality of emitters relative to the optical element.

13. The HMD of claim 11, wherein the first emitter is separated from the second emitter by one or more values of spacing in the range of 10 to 3,000 microns.

14. The HMD of claim 11, wherein the first emitter emits light in a first band, and the second emitter emits light in a second band different from the first band.

15. The HMD of claim 11, wherein the illumination source assembly comprises one or more emitters on a first substrate and one or more emitters on a second substrate.

16. The HMD of claim 11, wherein each of the first emitter and the second emitter are a laser diode.

17. The HMD of claim 11, wherein:
   the first emitter comprises a first set of laser diodes tilted with respect to an optical axis of the illumination source assembly, the second emitter comprises a second set of laser diodes tilted with respect to the optical axis of the illumination source assembly, and wherein the first set of laser diodes is configured to emit a first light, and the second set of laser diodes is configured to emit a second light, and the projection assembly is configured to project the first light to a first distance and to project the second light to a second distance that is greater than the first distance.

18. The HMD of claim 11, wherein the controller is configured to:

determine a first depth information based in part on one or more images of the local area illuminated with the light from the first emitter;

determine a second depth information based in part on one or more images of the local area illuminated with the light from the second emitter; and update a model of the local area based in part on the first depth information and the second depth information.

19. The HMD of claim 18, wherein the controller is configured to determine emission instructions based in part on the model of the local area, and provide the emission instructions to the illumination source assembly.

20. The HMD of claim 19, wherein the projection assembly is dynamically tilted relative to an optical axis of the illumination source assembly in accordance with the emission instructions.

* * * * *